UNITED STATES PATENT OFFICE.

HENRY GREVILLE, OF LIVERPOOL, ENGLAND.

TREATMENT OF FLOUR.

1,306,333.  Specification of Letters Patent.  Patented June 10, 1919.

No Drawing.  Application filed March 29, 1919.  Serial No. 286,191.

*To all whom it may concern:*

Be it known that I, HENRY GREVILLE, B. Sc., subject of the King of Great Britain, residing at Liverpool, in the county of Lancaster and Kingdom of England, have invented certain new and useful Improvements in or Relating to the Treatment of Flour, of which the following is a specification.

The present invention relates to improvements in the treatment of flour or stock (partly milled flour) for bread-making.

Flour and bread such as has been manufactured in Europe during the war, containing a high percentage of offal and designated as standard and war flour and bread has been found, in warm weather particularly, to decompose very quickly so that a great deal of the flour has been spoiled through being kept for a few weeks or even days. Similar decomposition is found to take place in flour used in hot climates and in various other kinds of flour.

This invention is designed to improve the keeping properties of both flour and bread, as it is designed to inhibit the development of bacteriological impurities such as "rope," which are especially prevalent in flour and bread in consequence of the admixture of wheat offals and cereals other than the wheat with the pure wheat flour, or in consequence of long storage or use in hot climates.

According to the present invention, a proportion of solid sodium chlorid (preferably in the form of the common salt of commerce, including salt which is used as food preservative such as dairy salt or salt substitutes used as food or as ingredients in food) in powdered or granular form, as distinct from solutions or spray, is mixed with the flour or with the stock at the mill itself or at some other time previous to the act of the manufacture of the bread.

By those means the flour is preserved and the inhibitive effect on the bacteriological impurities in both flour and bread is obtained.

This salt can take the place of part or the whole of the salt usually added in the manufacture or baking of the bread thus obtaining the additional advantage of giving a ready prepared article to the public.

Other chlorids, such as magnesium chlorid, may be used as an alternative to the above, or conjointly therewith.

It is preferred to use from one to four pounds of salt per sack of flour (280 pounds).

In certain cases it may be desirable to add in addition to the salt certain substances such as acid phosphates or other flour improvers in the usual amounts.

I declare that what I claim is:—

Flour which would be normally liable to decompose on keeping with which a relatively small amount of common salt has been admixed as a preservative in quantity sufficient to prevent bacteriological decomposition, such salt being added as solid at substantially the time of milling.

In witness whereof, I have hereunto signed my name in the presence of two subscribing witnesses.

HENRY GREVILLE.

Witnesses:
WILLIAM CRAWFORD DUNCAN,
THOMAS HAROLD PHILLIPS.